US008996246B2

(12) United States Patent
Kim

(10) Patent No.: US 8,996,246 B2
(45) Date of Patent: Mar. 31, 2015

(54) HAPTIC FEEDBACK APPARATUS FOR VEHICLE AND METHOD USING THE SAME

(71) Applicant: Electronics and Telecommunications Research Institute, Daejeon (KR)

(72) Inventor: Young-Back Kim, Daegu (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 13/939,847

(22) Filed: Jul. 11, 2013

(65) Prior Publication Data

US 2014/0067203 A1 Mar. 6, 2014

(30) Foreign Application Priority Data

Aug. 30, 2012 (KR) .................... 10-2012-0095631

(51) Int. Cl.
*B60W 50/16* (2012.01)
*B60Q 9/00* (2006.01)

(52) U.S. Cl.
CPC .............. *B60Q 9/00* (2013.01); *B60W 50/16* (2013.01); *F02D 2200/1012* (2013.01); *F02D 2200/602* (2013.01)
USPC .......................................... 701/36; 701/123

(58) Field of Classification Search
CPC .................. B60W 2540/10; B60W 2540/103; B60W 2540/106; B60W 30/00; B60W 30/02; B60W 30/04; B60W 30/045; B60W 2520/00; B60W 2520/10; B60W 2520/105; B60K 28/00; B60K 28/02; B60K 28/10; B60K 28/14; B60K 28/16; B60K 28/165
See application file for complete search history.

(56) References Cited

U.S. PATENT DOCUMENTS

| 6,636,197 | B1* | 10/2003 | Goldenberg et al. | 345/156 |
|---|---|---|---|---|
| 6,836,719 | B2* | 12/2004 | Andersson et al. | 701/93 |
| 7,400,963 | B2* | 7/2008 | Lee et al. | 701/93 |
| 8,447,489 | B2* | 5/2013 | Murata et al. | 701/96 |
| 8,630,792 | B2* | 1/2014 | Smith | 701/123 |
| 2002/0151297 | A1* | 10/2002 | Remboski et al. | 455/414 |
| 2003/0130091 | A1* | 7/2003 | Wafzig | 477/120 |
| 2004/0249533 | A1* | 12/2004 | Wheals et al. | 701/36 |
| 2005/0021226 | A1* | 1/2005 | Kustosch | 701/205 |
| 2005/0065687 | A1* | 3/2005 | Hijikata et al. | 701/41 |
| 2005/0110348 | A1* | 5/2005 | Hijikata et al. | 307/10.1 |
| 2005/0240319 | A1* | 10/2005 | Sawada | 701/1 |
| 2006/0109098 | A1* | 5/2006 | Grill et al. | 340/439 |
| 2007/0085667 | A1* | 4/2007 | Cicilloni et al. | 340/435 |
| 2007/0272464 | A1* | 11/2007 | Takae et al. | 180/169 |

(Continued)

FOREIGN PATENT DOCUMENTS

| JP | 2008-110744 | 5/2008 |
|---|---|---|
| KR | 10-2012-0018880 | 3/2012 |
| KR | 10-2012-0062491 | 6/2012 |

*Primary Examiner* — Jonathan M Dager
(74) *Attorney, Agent, or Firm* — Nelson Mullins Riley & Scarborough LLP; Anthony A. Laurentano, Esq.; Lewis Lee, Esq.

(57) ABSTRACT

Disclosed herein are a haptic feedback method and apparatus for a vehicle. The haptic feedback apparatus an accelerator pedal sensor unit, a control unit, and an output unit. The accelerator pedal sensor unit measures the angle of a vehicle accelerator pedal. The control unit determines whether the haptic feedback is required, using the measured angle of the vehicle accelerator pedal. The output unit deliver the haptic feedback to a user depending on the results of the determination.

16 Claims, 5 Drawing Sheets

(56) References Cited

U.S. PATENT DOCUMENTS

| | | | |
|---|---|---|---|
| 2007/0276582 A1* | 11/2007 | Coughlin | 701/123 |
| 2008/0042489 A1* | 2/2008 | Lewis et al. | 303/152 |
| 2009/0018723 A1* | 1/2009 | Chevion et al. | 701/36 |
| 2009/0112439 A1* | 4/2009 | Kuang et al. | 701/99 |
| 2010/0030458 A1* | 2/2010 | Coughlin | 701/123 |
| 2010/0217486 A1* | 8/2010 | Taguchi | 701/41 |
| 2011/0102166 A1* | 5/2011 | Filev et al. | 340/435 |
| 2011/0106334 A1* | 5/2011 | Filev et al. | 701/1 |
| 2011/0106381 A1* | 5/2011 | Filev et al. | 701/40 |
| 2011/0172864 A1* | 7/2011 | Syed et al. | 701/22 |
| 2011/0187520 A1* | 8/2011 | Filev et al. | 340/438 |
| 2011/0193693 A1* | 8/2011 | Filev et al. | 340/435 |
| 2012/0078467 A1* | 3/2012 | Schweikl et al. | 701/36 |
| 2012/0143439 A1* | 6/2012 | Kim et al. | 701/36 |
| 2012/0203399 A1* | 8/2012 | Filev et al. | 701/1 |
| 2012/0245775 A1* | 9/2012 | Syed et al. | 701/22 |
| 2013/0158838 A1* | 6/2013 | Yorke et al. | 701/103 |
| 2014/0038137 A1* | 2/2014 | Hill | 434/62 |

* cited by examiner

US 8,996,246 B2

HAPTIC FEEDBACK APPARATUS FOR VEHICLE AND METHOD USING THE SAME

CROSS REFERENCE TO RELATED APPLICATION

This application claims the benefit of Korean Patent Application No. 10-2012-0095631, filed on Aug. 30, 2012, which is hereby incorporated by reference in its entirety into this application.

BACKGROUND OF THE INVENTION

1. Technical Field

The present invention relates generally to a haptic feedback apparatus for a vehicle and a method using the same and, more particularly, to a haptic feedback apparatus for a vehicle and a method using the same that, when a user presses an accelerator pedal, deliver haptic feedback based on the angle of the accelerator pedal and the RPM of an engine to a foot of the user and display the angle of the accelerator pedal on a dashboard.

2. Description of the Related Art

In general, in order to accelerate a vehicle, a user should control an accelerator pedal according to his or her sensation and experience. When rapidly accelerating a vehicle because of the inexperienced control of an accelerator pedal, a novice user is confused, which may lead to damage to a vehicle or a deadly accident.

Korean Patent Application Publication No. 2012-0018880 discloses the structure of an accelerator pedal that measures force that is applied to the accelerator pedal and sends a signal that invalidates the force applied to the accelerator pedal to an engine if a measured value is equal to or higher than a predetermined value, so that the engine is switched to specific mode, thereby preventing the rapid acceleration of a vehicle attributable to the erroneous operation of the accelerator pedal.

The conventional technology discloses only a structure of an accelerator pedal that, when a user who wants quick braking presses the accelerator pedal by mistake, sends a signal that invalidates force applied to the accelerator pedal to an engine, so that the engine is switched to a specific mode, thereby preventing the rapid acceleration of a vehicle. However, the conventional technology does not disclose a technology in which haptic feedback based on the angle of the accelerator pedal and the RPM of the engine is delivered to a foot of a user and the angle of the accelerator pedal is displayed on a dashboard. Furthermore, the conventional technology is problematic in that it is difficult to apply to a case where a user slowly accelerates a vehicle because the conventional technology can be applied to a case where a user who wants quick braking mistakenly presses the accelerator pedal.

Accordingly, there is an urgent need for new haptic feedback technology for a vehicle in which measures that allow various types of rapid acceleration to be determined can be visually displayed to a user and can be delivered to a foot of the user, so that the user can intuitively be made aware of the manipulation status of an accelerator pedal and can actively prevent rapid acceleration.

SUMMARY OF THE INVENTION

Accordingly, the present invention has been made keeping in mind the above problems occurring in the prior art, and an object of the present invention is to generate a haptic feedback apparatus for a vehicle and a method using the same that can measure the angle of a vehicle accelerator pedal, can determine whether haptic feedback is required based on the measured angle of the vehicle accelerator pedal, and can deliver the haptic feedback to a user based on the results of the determination.

Another object of the present invention is to generate a haptic feedback apparatus for a vehicle and a method using the same that can display the angle of a vehicle accelerator pedal on a dashboard, thereby more effectively delivering the manipulation status of an accelerator pedal to a user from a visual viewpoint.

Yet another object of the present invention is to generate a haptic feedback apparatus for a vehicle and a method using the same that can determine whether haptic feedback is required based on each vehicle accelerator pedal angle or can deliver different haptic feedback to the user, thereby delivering subdivided haptic feedback to a user.

Another object of the present invention is a haptic feedback apparatus for a vehicle and a method using the same that can deliver feedback to a foot of a user in the form of a vibration or a click of a vehicle accelerator pedal, thereby enabling the haptic feedback apparatus to be more realistic.

Yet another object of the present invention is a haptic feedback apparatus for a vehicle and a method using the same that can measure a vehicle engine RPM increment in addition to the angle of a vehicle accelerator pedal, can determine whether haptic feedback is required based on the measured vehicle engine RPM increment, and can deliver the haptic feedback to a user based on the results of the determination.

In accordance with an aspect of the present invention, there is generated a haptic feedback apparatus for a vehicle, including an accelerator pedal sensor unit configured to measure the angle of a vehicle accelerator pedal; a control unit configured to determine whether haptic feedback is required, using the measured angle of the vehicle accelerator pedal; and an output unit configured to deliver the haptic feedback to a user depending on the results of the determination.

The haptic feedback apparatus may further include a display unit configured to visually display the measured angle of the vehicle accelerator pedal on a dashboard.

The control unit may include an accelerator pedal angle comparison unit configured to determine whether the measured angle of the vehicle accelerator pedal falls within a predetermined vehicle accelerator pedal angle range; and an accelerator pedal angle processing unit configured to generate the haptic feedback corresponding to the predetermined vehicle accelerator pedal angle range.

The control unit may determine whether the haptic feedback is required, or generates the haptic feedback corresponding to each of the predetermined vehicle accelerator pedal angle ranges.

The accelerator pedal angle processing unit may generate the haptic feedback to the output unit if the measured angle of the vehicle accelerator pedal falls within the predetermined vehicle accelerator pedal angle range.

The haptic feedback may be feedback in the form of a vibration or a click of the vehicle accelerator pedal.

The haptic feedback apparatus may further include an engine sensor unit configured to measure the RPM of a vehicle engine.

The control unit may further include an engine RPM increment comparison unit configured to measure a vehicle engine RPM increment using the RPM of the vehicle engine and to determine whether the measured vehicle engine RPM increment exceeds a predetermined vehicle engine RPM increment; and an engine RPM increment processing unit configured to generate the haptic feedback corresponding to the predetermined vehicle engine RPM increment.

The engine RPM increment processing unit may generate the haptic feedback to the output unit if the vehicle engine RPM increment exceeds the predetermined vehicle engine RPM increment.

The haptic feedback may be feedback in the form of a vibration or a click of the vehicle accelerator pedal.

In accordance with an aspect of the present invention, there is generated a haptic feedback method for a vehicle, including measuring the angle of a vehicle accelerator pedal; determining whether haptic feedback is required, using the measured angle of the vehicle accelerator pedal; and delivering the haptic feedback to a user depending on the results of the determination.

The haptic feedback method may further include visually displaying the measured angle of the vehicle accelerator pedal on a dashboard.

Determining whether the haptic feedback is required may include determining whether the measured angle of the vehicle accelerator pedal falls within a predetermined vehicle accelerator pedal angle range; and generating the haptic feedback corresponding to the predetermined vehicle accelerator pedal angle.

Determining whether the haptic feedback is required may include determining whether haptic feedback is required, or generates the haptic feedback corresponding to each of the predetermined vehicle accelerator pedal angle ranges.

Generating the haptic feedback corresponding to the predetermined vehicle accelerator pedal angle may include generating the haptic feedback if the angle of the vehicle accelerator pedal falls within the predetermined vehicle accelerator pedal angle range.

The haptic feedback may be feedback in the form of a vibration or a click of the vehicle accelerator pedal.

The haptic feedback method may further include measuring the RPM of a vehicle engine.

Determining whether the haptic feedback is required may further include measuring a vehicle engine RPM increment using the RPM of the vehicle engine, and determining whether the measured vehicle engine RPM increment exceeds a predetermined vehicle engine RPM increment; and generating the haptic feedback corresponding to the predetermined vehicle engine RPM increment.

Generating the haptic feedback corresponding to the predetermined vehicle engine RPM increment may include generating the haptic feedback if the vehicle engine RPM increment exceeds the predetermined vehicle engine RPM increment.

The haptic feedback may be feedback in the form of a vibration or a click of the vehicle accelerator pedal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art.

Embodiments of the present invention will be described below with reference to the accompanying drawings below.

Figure 1:
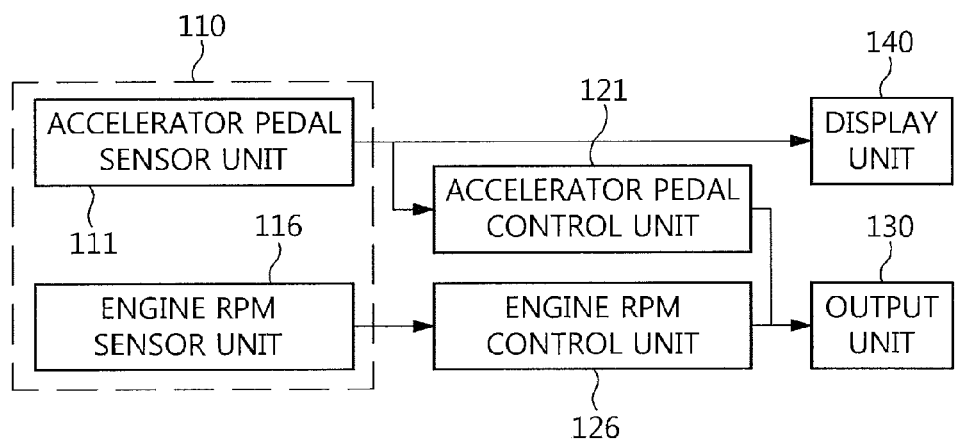
FIG. 1 is a block diagram showing a haptic feedback apparatus for a vehicle according to an embodiment of the present invention.

FIG. 1 is a block diagram showing a haptic feedback apparatus for a vehicle according to an embodiment of the present invention.

Referring to FIG. 1, the haptic feedback apparatus for a vehicle according to the present invention includes an accelerator pedal sensor unit 111, an engine RPM sensor unit 116, control units 121 and 126, and an output unit 130.

The accelerator pedal sensor unit 111 corresponds to an element that measures the angle of a vehicle accelerator pedal.

The accelerator pedal sensor unit 111 may measure force that is applied to an accelerator pedal, and may calculate the angle of a vehicle accelerator pedal based on the measured force. Alternatively, the accelerator pedal sensor unit 111 may directly measure the angle of a vehicle accelerator pedal.

The engine RPM sensor unit 116 corresponds to an element that measures a vehicle engine RPM increment.

The engine RPM sensor unit 116 may measure a vehicle engine RPM, and may calculate a vehicle engine RPM increment based on the measured vehicle engine RPM. Alternatively, the engine RPM sensor unit 116 may directly measure a vehicle engine RPM increment.

The control units include an accelerator pedal control unit 121 and an engine RPM control unit 126.

The output unit 130 corresponds to an element for delivering haptic feedback to a user.

The output unit may include a vehicle engine pedal for generating, for example, a vibration or a jerk.

That is, the haptic feedback apparatus for a vehicle shown in FIG. 1 may measure the angle of a vehicle accelerator pedal or a vehicle engine RPM increment using the sensor unit 110 including the accelerator pedal sensor unit 111 and the engine RPM sensor unit 116, may determine whether haptic feedback is required based on the measured angle of the vehicle accelerator pedal or vehicle engine RPM increment using the control units 121 and 126, and may deliver the haptic feedback to a user based on the results of the determination using the output unit 130.

Although not shown in FIG. 1, the haptic feedback apparatus for a vehicle according to an embodiment of the present invention may further include a display unit.

The display unit may be, for example, an element for visually displaying the angle of a vehicle accelerator pedal on a dashboard.

More particularly, the display unit may display the angle of a vehicle accelerator pedal using a number and a shape whose slope varies, such as a needle. By displaying the angle of a vehicle accelerator pedal on a dashboard in a shape form, a user can intuitively be aware of the manipulation state of the accelerator pedal.

Furthermore, the display unit may use LEDs as means for displaying the angle of a vehicle accelerator pedal.

Figure 2:
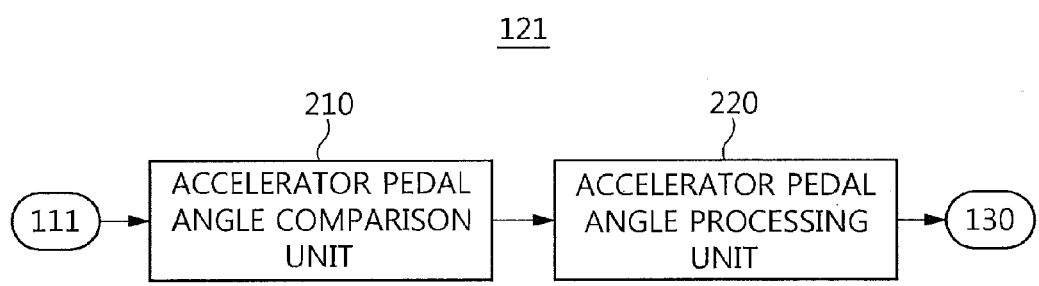
FIG. 2 is a block diagram showing an example of an accelerator pedal control unit shown in FIG. 1.

FIG. 2 is a block diagram showing an example of the accelerator pedal control unit 121 shown in FIG. 1.

Referring to FIG. 2, the accelerator pedal control unit 121 of FIG. 1 includes an accelerator pedal angle comparison unit 210, and an accelerator pedal angle processing unit 220.

The accelerator pedal angle comparison unit 210 determines whether the angle of a vehicle accelerator pedal measured by the accelerator pedal sensor unit 111 falls within a predetermined vehicle accelerator pedal angle range.

The number of predetermined vehicle accelerator pedal angle ranges may be plural.

The accelerator pedal angle comparison unit 210 may determine whether haptic feedback is required, or generates the haptic feedback corresponding to each of the predetermined vehicle accelerator pedal angle ranges.

If the angle of the vehicle accelerator pedal falls within the predetermined vehicle accelerator pedal angle range, the accelerator pedal angle comparison unit 210 determines that the haptic feedback is required.

However, if the angle of the vehicle accelerator pedal does not fall within the predetermined vehicle accelerator pedal angle range, the accelerator pedal angle comparison unit 210 determines that the haptic feedback is not required.

If the accelerator pedal angle comparison unit 210 determines that the haptic feedback is required, the accelerator pedal angle processing unit 220 generates the haptic feedback corresponding to the predetermined vehicle accelerator pedal angle range.

The accelerator pedal angle processing unit 220 may deliver different haptic feedback for each predetermined vehicle accelerator pedal angle range.

The haptic feedback may be, for example, a signal that causes the output unit 130 to generate a vibration or a jerk.

If the accelerator pedal angle comparison unit 210 determines that the haptic feedback is not required, the accelerator pedal angle processing unit 220 compares the angle of the vehicle accelerator pedal measured by the accelerator pedal sensor unit 111 with the predetermined vehicle accelerator pedal angle range.

Figure 3:
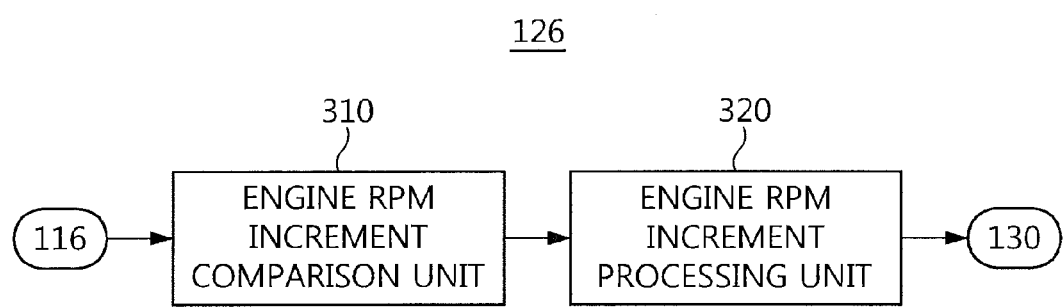
FIG. 3 is a block diagram showing an example of an engine RPM control unit shown in FIG. 1.
Figure 3:
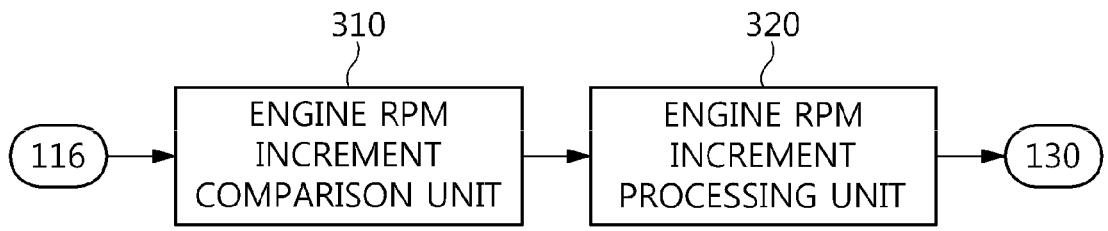

FIG. 3 is a block diagram showing an example of the engine RPM control unit 126 shown in FIG. 1.

Referring to FIG. 3, the engine RPM control unit of FIG. 1 includes an engine RPM increment comparison unit 310 and an engine RPM increment processing unit 320.

The engine RPM increment comparison unit 310 determines whether a vehicle engine RPM increment measured by the engine RPM sensor unit 116 exceeds a predetermined vehicle engine RPM increment.

If the vehicle engine RPM increment exceeds the predetermined vehicle engine RPM increment, the engine RPM increment comparison unit 310 determines that haptic feedback is required.

In contrast, if it is determined that the vehicle engine RPM increment does not exceed the predetermined vehicle engine RPM increment, the engine RPM increment comparison unit 310 determines that haptic feedback is not required If the engine RPM increment comparison unit 310 determines that the haptic feedback is required, the engine RPM increment processing unit 320 generates the haptic feedback corresponding to the predetermined vehicle engine RPM increment.

The haptic feedback may be, for example, a signal that causes the output unit 130 to generate a vibration or a jerk.

If the engine RPM increment comparison unit 310 determines that the haptic feedback is not required, the engine RPM increment processing unit 320 compares a vehicle engine RPM increment measured by the engine RPM sensor unit 116 with the predetermined vehicle engine RPM increment.

Figure 4:
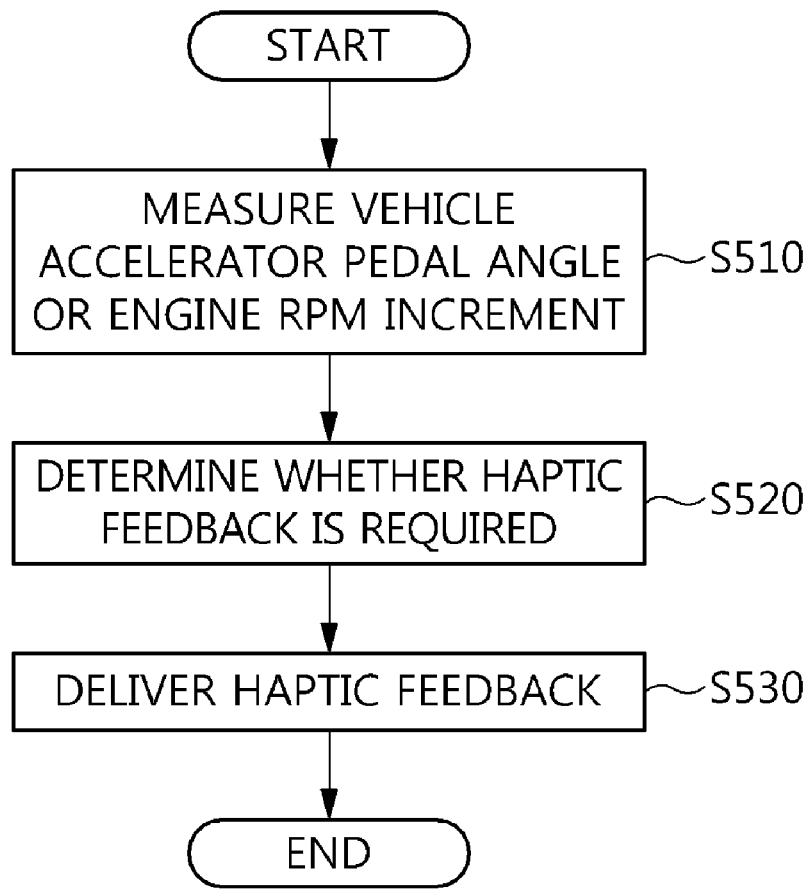
FIG. 4 is a flowchart illustrating a haptic feedback method for a vehicle according to an embodiment of the present invention.

FIG. 4 is a flowchart illustrating a haptic feedback method for a vehicle according to an embodiment of the present invention.

Referring to FIG. 4, in the haptic feedback method for a vehicle according to an embodiment of the present invention, first, the angle of a vehicle accelerator pedal or the increment of the RPM of a vehicle engine (vehicle engine RPM increment) is measured at step S510.

At step S510, in order to measure the angle of the vehicle accelerator pedal, force that is applied to the accelerator pedal may be measured and the angle of the vehicle accelerator pedal may be calculated based on the measured force. Alternatively, the angle of the vehicle accelerator pedal may be directly measured. In order to measure the vehicle engine RPM increment, a vehicle engine RPM may be measured and the vehicle engine RPM increment may be calculated based on the measured vehicle engine RPM. Alternatively, the vehicle engine RPM increment may be directly measured.

Thereafter, in the haptic feedback method for a vehicle according to an embodiment of the present invention, whether haptic feedback is required is determined based on the measured angle of the vehicle accelerator pedal or the vehicle engine RPM increment at step S520.

Thereafter, in the haptic feedback method for a vehicle according to an embodiment of the present invention, haptic feedback is delivered to a user based on the results of the determination at step S530.

At step S530, a vibration or a click may be applied to the vehicle accelerator pedal.

Figure 5:
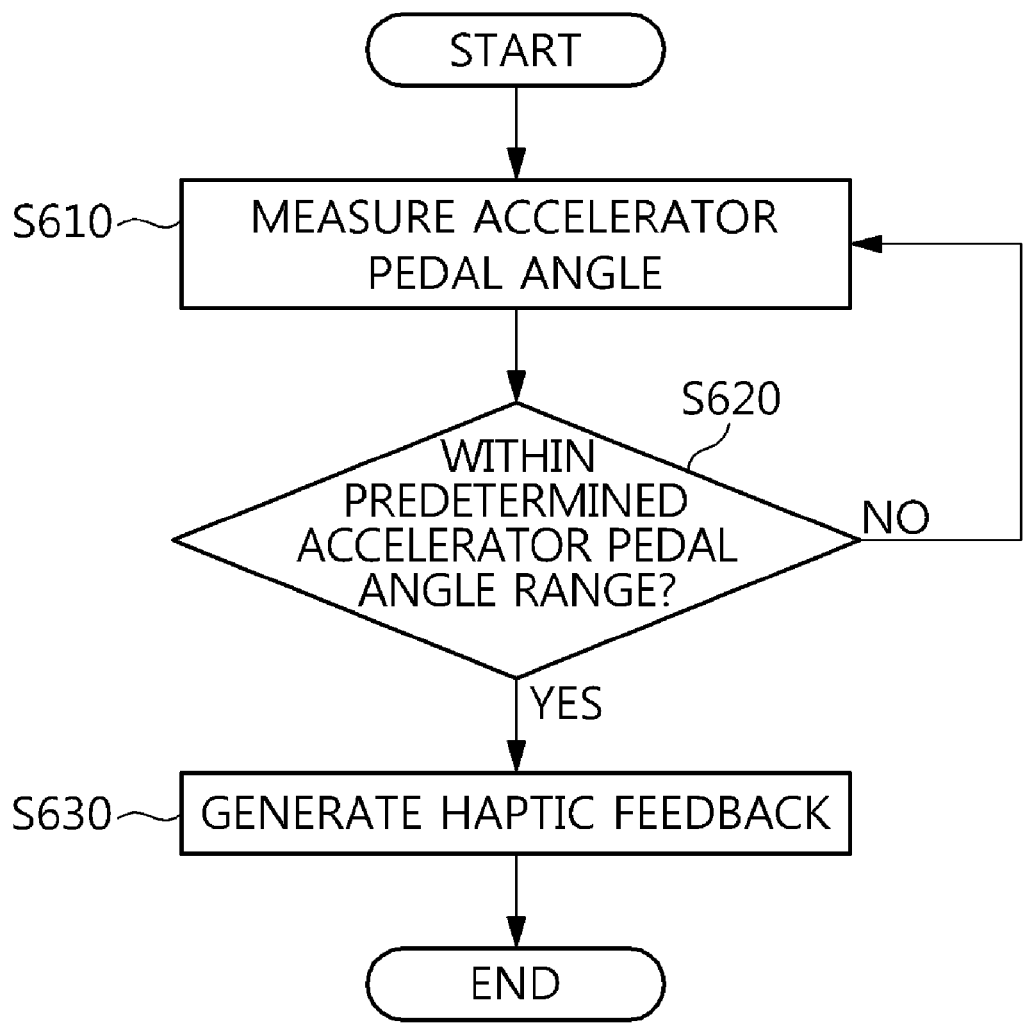
FIG. 5 is a flowchart illustrating an example of the step of determining whether haptic feedback is required, the step having been shown in FIG. 4.

FIG. 5 is a flowchart illustrating an example of step S520 of determining whether haptic feedback is required, the step being shown in FIG. 4.

Referring to FIG. 5, in the step of determining whether haptic feedback is required, shown in FIG. 4, first, the angle of a vehicle accelerator pedal is measured at step S610.

Thereafter, whether the measured angle of the vehicle accelerator pedal falls within a predetermined vehicle accelerator pedal angle range is determined at step S620.

At step S620, whether the measured angle of the vehicle accelerator pedal falls within a plurality of predetermined vehicle accelerator pedal angle ranges may be determined.

In this case, whether haptic feedback is required may be determined for each of the predetermined vehicle accelerator pedal angle ranges.

If the measured angle of the vehicle accelerator pedal falls within the predetermined vehicle accelerator pedal angle range, it may be determined that the haptic feedback is required.

In contrast, if the measured angle of the vehicle accelerator pedal does not fall within the predetermined vehicle accelerator pedal angle range, it may be determined that the haptic feedback is not required.

Thereafter, if it is determined that the haptic feedback is required, the haptic feedback is generated at step S630.

At step S630, different haptic feedback may be generated for each of the predetermined vehicle accelerator pedal angle ranges.

In contrast, if it is determined that the haptic feedback is not required, the process returns to the step S610 of measuring the angle of the vehicle accelerator pedal.

Figure 6:
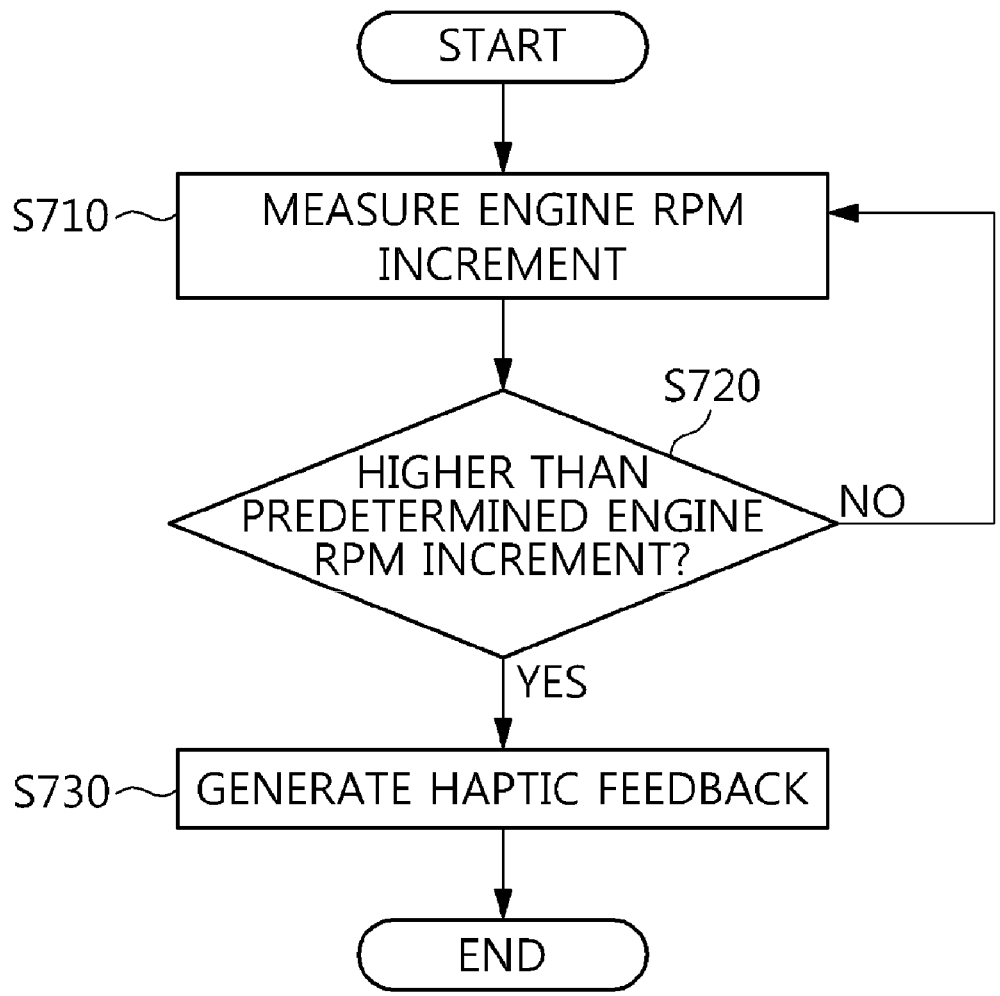
FIG. 6 is a flowchart illustrating a step of determining whether haptic feedback is required, the step having been shown in FIG. 4.

FIG. 6 is a flowchart illustrating the step S520 of determining whether haptic feedback is required, the step having been shown in FIG. 4.

Referring to FIG. 6, in the step of determining whether haptic feedback is required, shown in FIG. 4, a vehicle engine RPM increment is measured at step S710.

Thereafter, whether the measured vehicle engine RPM increment exceeds a predetermined vehicle engine RPM increment is determined at step S720.

If it is determined at step 720 that the measured vehicle engine RPM increment exceeds the predetermined vehicle engine RPM increment, it is determined that haptic feedback is required.

In contrast, if it is determined at step 720 that the measured vehicle engine RPM increment does not exceed the predetermined vehicle engine RPM increment, it is determined that haptic feedback is not required.

Thereafter, if it is determined at step 720 that the haptic feedback is required, the haptic feedback is generated at step S730.

In contrast, if it is determined at step S720 that the haptic feedback is required, the process returns to step S710 of measuring a vehicle engine RPM increment.

As described above, the haptic feedback apparatus for a vehicle and the method using the same in accordance with the present invention can measure the angle of a vehicle accelerator pedal, can determine whether haptic feedback is required based on the measured angle of the vehicle accelerator pedal, and can deliver the haptic feedback to a user based on the results of the determination.

Furthermore, the haptic feedback apparatus for a vehicle and the method using the same in accordance with the present invention can display the angle of a vehicle accelerator pedal on a dashboard, thereby more effectively delivering the manipulation status of an accelerator pedal to a user from a visual viewpoint.

Furthermore, the haptic feedback apparatus for a vehicle and the method using the same in accordance with the present invention can determine whether haptic feedback is required based on each vehicle accelerator pedal angle or can deliver different haptic feedback to the user, thereby delivering subdivided haptic feedback to a user.

Furthermore, the haptic feedback apparatus for a vehicle and the method using the same in accordance with the present invention can deliver feedback to a foot of a user in the form of a vibration or a click of a vehicle accelerator pedal, thereby enabling the haptic feedback apparatus to be more realistic.

Moreover, the haptic feedback apparatus for a vehicle and the method using the same in accordance with the present invention can measure a vehicle engine RPM increment in addition to the angle of a vehicle accelerator pedal, can determine whether haptic feedback is required based on the measured vehicle engine RPM increment, and can deliver the haptic feedback to a user based on the results of the determination.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A haptic feedback apparatus for a vehicle, comprising:
an accelerator pedal sensor unit configured to measure an angle of a vehicle accelerator pedal;
a control unit configured to determine whether the haptic feedback is required, using the measured angle of the vehicle accelerator pedal; and
an output unit configured to deliver the haptic feedback to a user depending on results of the determination,
wherein the control unit determines whether the haptic feedback is required or the control unit generates the haptic feedback corresponding to each of the predetermined vehicle accelerator pedal angle ranges,
wherein the control unit includes
an engine RPM increment comparison unit configured to measure a vehicle engine RPM increment using the RPM of the vehicle engine and to determine whether the measured vehicle engine RPM increment exceeds a predetermined vehicle engine RPM increment, and
an engine RPM increment processing unit configured to generate the haptic feedback corresponding to the predetermined vehicle engine RPM increment.

2. The haptic feedback apparatus of claim 1, further comprising a display unit configured to visually display the measured angle of the vehicle accelerator pedal on a dashboard.

3. The haptic feedback apparatus of claim 2, wherein the control unit further includes:
an accelerator pedal angle comparison unit configured to determine whether the measured angle of the vehicle accelerator pedal falls within a predetermined vehicle accelerator pedal angle range; and
an accelerator pedal angle processing unit configured to generate the haptic feedback corresponding to the predetermined vehicle accelerator pedal angle range.

4. The haptic feedback apparatus of claim 3, wherein the accelerator pedal angle processing unit generates the haptic feedback to the output unit if the measured angle of the vehicle accelerator pedal falls within the predetermined vehicle accelerator pedal angle range.

5. The haptic feedback apparatus of claim 4, wherein the haptic feedback is feedback in the form of a vibration or a click of the vehicle accelerator pedal.

6. The haptic feedback apparatus of claim 3, further comprising an engine sensor unit configured to measure an RPM of a vehicle engine.

7. The haptic feedback apparatus of claim 6, wherein the engine RPM increment processing unit generates the haptic feedback to the output unit if the vehicle engine RPM increment exceeds the predetermined vehicle engine RPM increment.

8. The haptic feedback apparatus of claim 7, wherein the haptic feedback is feedback in the form of a vibration or a click of the vehicle accelerator pedal.

9. A haptic feedback method for a vehicle, comprising:
measuring an angle of a vehicle accelerator pedal;
determining whether haptic feedback is required, using the measured angle of the vehicle accelerator pedal; and
delivering the haptic feedback to a user depending on results of the determination,
wherein the determining whether the haptic feedback is required includes determining whether the haptic feedback is required or generating the haptic feedback corresponding to each of the predetermined vehicle accelerator pedal angle ranges,
wherein determining whether the haptic feedback is required includes measuring a vehicle engine RPM increment using the RPM of the vehicle engine, determining whether the measured vehicle engine RPM increment exceeds a predetermined vehicle engine RPM increment, and generating the haptic feedback corresponding to the predetermined vehicle engine RPM increment.

10. The haptic feedback method of claim 9, further comprising visually displaying the measured angle of the vehicle accelerator pedal on a dashboard.

11. The haptic feedback method of claim 10, wherein determining whether the haptic feedback is required further includes:

determining whether the measured angle of the vehicle accelerator pedal falls within a predetermined vehicle accelerator pedal angle range; and generating the haptic feedback corresponding to the predetermined vehicle accelerator pedal angle range.

12. The haptic feedback method of claim 11, wherein generating the haptic feedback corresponding to the predetermined vehicle accelerator pedal angle includes generating the haptic feedback if the angle of the vehicle accelerator pedal falls within the predetermined vehicle accelerator pedal angle range.

13. The haptic feedback method of claim 12, wherein the haptic feedback is feedback in the form of a vibration or a click of the vehicle accelerator pedal.

14. The haptic feedback method of claim 11, further comprising measuring an RPM of a vehicle engine.

15. The haptic feedback method of claim 14, wherein generating the haptic feedback corresponding to the predetermined vehicle engine RPM increment includes generating the haptic feedback if the vehicle engine RPM increment exceeds the predetermined vehicle engine RPM increment.

16. The haptic feedback method of claim 15, wherein the haptic feedback is feedback in the form of a vibration or a click of the vehicle accelerator pedal.

* * * * *